United States Patent
Ifergan

(10) Patent No.: US 7,033,018 B2
(45) Date of Patent: Apr. 25, 2006

(54) EYEGLASS DEVICE

(75) Inventor: Thierry Ifergan, Aventura, FL (US)

(73) Assignee: Chic Optic Inc., Montreal (CA)

( * ) Notice: Subject to any disclaimer, the term of this patent is extended or adjusted under 35 U.S.C. 154(b) by 2 days.

(21) Appl. No.: 10/759,105

(22) Filed: Jan. 20, 2004

(65) Prior Publication Data

US 2004/0257523 A1    Dec. 23, 2004

Related U.S. Application Data

(63) Continuation of application No. 10/394,651, filed on Mar. 24, 2003, now Pat. No. 6,820,976.

(60) Provisional application No. 60/366,247, filed on Mar. 22, 2002.

(51) Int. Cl.
*G02C 9/00*    (2006.01)

(52) U.S. Cl. ............................... 351/47; 351/57

(58) Field of Classification Search .................. 351/47, 351/48, 57, 58, 44, 41, 158
See application file for complete search history.

(56) References Cited

U.S. PATENT DOCUMENTS

| | | |
|---|---|---|
| 1,679,233 A | 7/1928 | Strauss |
| 2,737,847 A | 3/1956 | Tesauro |
| 2,770,168 A | 11/1956 | Tesauro |
| 3,498,701 A | 3/1970 | Miller |
| 3,531,188 A | 9/1970 | LeBlanc et al. |
| 3,531,190 A | 9/1970 | LeBlanc |
| 3,536,385 A | 10/1970 | Johnston |
| 3,565,517 A | 2/1971 | Gitlin et al. |
| 3,582,192 A | 6/1971 | Giltlin |
| 3,838,914 A | 10/1974 | Fernandez |
| 3,917,940 A | 11/1975 | Duddy |
| 4,070,103 A | 1/1978 | Meeker |
| 4,070,105 A | 1/1978 | Marzouk |
| 4,196,981 A | 4/1980 | Waldrop |
| 4,217,037 A | 8/1980 | Lemelson |
| 4,547,909 A | 10/1985 | Bell |
| 4,750,828 A | 6/1988 | Sartor |
| 4,896,787 A | 1/1990 | Delamour et al. |
| 4,932,771 A | 6/1990 | Nowottny |
| 4,988,181 A | 1/1991 | Riach, Jr. |
| 5,009,495 A | 4/1991 | Williams |
| 5,115,540 A | 5/1992 | Delorme |
| 5,181,051 A | 1/1993 | Townsend et al. |
| 5,243,366 A | 9/1993 | Blevins |
| 5,321,442 A | 6/1994 | Albanese |
| 5,389,981 A | 2/1995 | Riach, Jr. |
| 5,410,763 A | 5/1995 | Bollé |
| 5,416,537 A | 5/1995 | Sadler |
| 5,431,506 A | 7/1995 | Masunaga |
| 5,568,207 A | 10/1996 | Chao |

(Continued)

FOREIGN PATENT DOCUMENTS

CA    2216280    8/1996

(Continued)

*Primary Examiner*—Hung Xuan Dang
(74) *Attorney, Agent, or Firm*—Ralph A. Dowell; Dowell & Dowell, P.C.

(57) ABSTRACT

Eyeglasses comprise a pair of spectacles having primary lenses and an auxiliary lens assembly attached to the spectacles. The auxiliary lens assembly is secured by a subframe that includes at least one arm having a magnet at one end to co-operate with a magnet provided on the spectacles. A hinge is provided on the subframe at the opposite end of the arm to allow the auxiliary lens assembly to move from a position in which the primary lenses are covered to a position in which they are exposed.

14 Claims, 8 Drawing Sheets

U.S. PATENT DOCUMENTS

| | | | |
|---|---|---|---|
| 5,583,588 A | 12/1996 | Chao |
| 5,592,243 A | 1/1997 | Chao |
| 5,627,608 A | 5/1997 | Chao |
| 5,631,719 A | 5/1997 | Chao |
| 5,640,217 A | 6/1997 | Hautcoeur et al. |
| 5,642,177 A | 6/1997 | Nishioka |
| 5,651,146 A | 7/1997 | Chao |
| 5,682,222 A | 10/1997 | Chao |
| 5,689,835 A | 11/1997 | Chao |
| 5,696,571 A | 12/1997 | Spencer et al. |
| 5,737,054 A | 4/1998 | Chao |
| 5,786,880 A | 7/1998 | Chao |
| 5,805,259 A | 9/1998 | Chao |
| 5,815,899 A | 10/1998 | Chao |
| 5,877,838 A | 3/1999 | Chao |
| 5,882,101 A | 3/1999 | Chao |
| 5,883,688 A | 3/1999 | Chao |
| 5,883,689 A | 3/1999 | Chao |
| 5,889,575 A | 3/1999 | Wang |
| 5,894,335 A | 4/1999 | Hoffman |
| 5,929,964 A | 7/1999 | Chao |
| 5,936,700 A | 8/1999 | Masunaga |
| 5,940,162 A | 8/1999 | Wong |
| 5,975,691 A | 11/1999 | Ku |
| 6,012,811 A | 1/2000 | Chao et al. |
| 6,092,896 A | 7/2000 | Chao et al. |
| 6,109,747 A | 8/2000 | Chao |
| 6,116,730 A | 9/2000 | Kwok |
| 6,116,732 A | 9/2000 | Xiao |
| 6,132,040 A | 10/2000 | Xiao |
| 6,139,141 A | 10/2000 | Zider |
| 6,139,142 A | 10/2000 | Zelman |
| 6,149,269 A | 11/2000 | Madison |
| 6,164,774 A | 12/2000 | Cate |
| 6,168,341 B1 | 1/2001 | Chene et al. |
| 6,170,948 B1 | 1/2001 | Chao |
| 6,170,949 B1 | 1/2001 | Mauch |
| 6,231,179 B1 | 5/2001 | Lee |
| 6,264,323 B1 | 7/2001 | Chao |
| 6,270,274 B1 | 8/2001 | Chao |
| 6,305,799 B1 | 10/2001 | Chao |
| RE37,545 E | 2/2002 | Chao |
| 6,367,926 B1 | 4/2002 | Chao et al. |
| 6,412,942 B1 | 7/2002 | McKenna et al. |
| 6,488,372 B1 | 12/2002 | Park |
| 6,550,913 B1 | 4/2003 | Zelman |
| 6,585,370 B1 | 7/2003 | Zelman |
| 6,601,953 B1 * | 8/2003 | Xiao | 351/47 |
| 6,820,976 B1 * | 11/2004 | Ifergan | 351/47 |
| 2001/0036170 A1 | 11/2001 | Xiao |
| 2002/0093622 A1 | 7/2002 | Tostado |

FOREIGN PATENT DOCUMENTS

| | | |
|---|---|---|
| CA | 2180714 | 8/1997 |
| CA | 2235088 | 10/1998 |
| CA | 2235802 | 10/1998 |
| CA | 2235818 | 10/1998 |
| CA | 2235823 | 10/1998 |
| CA | 2235826 | 10/1998 |
| CA | 2286765 | 10/1998 |
| CA | 2313976 | 10/1998 |
| CA | 2372382 | 10/1998 |
| CA | 2236025 | 4/1999 |
| CA | 2223295 | 7/1999 |
| CA | 2235917 | 8/1999 |
| CA | 2235897 | 12/1999 |
| CA | 2274221 | 12/1999 |
| CA | 2292390 | 4/2000 |
| CA | 2269373 | 5/2000 |
| CA | 2302540 | 6/2000 |
| CA | 2337146 | 6/2000 |
| CA | 2235798 | 7/2000 |
| CA | 2258142 | 3/2001 |
| CA | 2235466 | 2/2002 |
| CA | 2367159 | 9/2002 |
| CH | 572222 | 1/1976 |
| CN | 107096 | 1/1989 |
| CN | 1117593 A | 2/1996 |
| CN | 274588 | 4/1996 |
| DE | 1797366 | 1/1971 |
| DE | G85 07 761.5 U1 | 6/1985 |
| DE | G88 06 898.6 U1 | 10/1988 |
| DE | 3 905 041 A1 | 8/1990 |
| DE | 3 919 489 A1 | 12/1990 |
| DE | 3 920 879 A1 | 1/1991 |
| DE | 3 921 987 A1 | 1/1991 |
| DE | 3 933 310 A1 | 1/1991 |
| DE | G92 16 919.8 U1 | 4/1993 |
| DE | 4 316 698 A1 | 11/1994 |
| DE | 29518590 U1 | 3/1996 |
| DE | 29516670 U1 | 5/1996 |
| DE | 19543346 C1 | 1/1997 |
| DE | 19649694 A1 | 6/1998 |
| EP | 0469699 A1 | 2/1992 |
| EP | 0743545 A1 | 11/1996 |
| EP | 0773463 A1 | 5/1997 |
| EP | 0848276 A1 | 6/1998 |
| EP | 0773463 B1 | 12/1998 |
| EP | 0881517 A1 | 12/1998 |
| EP | 1184711 A1 | 3/2002 |
| EP | 0877279 B1 | 6/2004 |
| FR | 0 915 421 | 11/1946 |
| FR | 1 037 755 | 9/1953 |
| FR | 1 061 253 | 4/1954 |
| FR | 1 266 652 | 6/1961 |
| FR | 2 483 632 | 12/1981 |
| FR | 2 657 436 | 7/1991 |
| FR | 2 746 151 | 5/1998 |
| FR | 2 803 920 | 4/2002 |
| FR | 2 831 677 | 5/2003 |
| GB | 846425 | 8/1960 |
| GB | 855268 | 11/1960 |
| JP | 44-15392 | 4/1966 |
| JP | 54-11841 A2 | 9/1979 |
| JP | 54-111842 A2 | 9/1979 |
| JP | 55-50217 | 4/1980 |
| JP | 56-29209 | 3/1981 |
| JP | 57-184910 | 11/1982 |
| JP | 61-2621 | 1/1986 |
| JP | 01-136114 | 5/1989 |
| JP | 02-109325 | 8/1990 |
| JP | 05-40493 | 8/1990 |
| JP | 05-157997 A2 | 6/1993 |
| JP | 03-011174 | 3/1995 |
| JP | 07-128620 A | 5/1995 |
| JP | 07-156856 | 5/1995 |
| JP | 08-153172 | 5/1996 |
| JP | 03-031881 | 9/1996 |
| JP | 09-101489 A2 | 4/1997 |
| JP | 09-105889 | 4/1997 |
| JP | 09-138374 | 5/1997 |
| KR | 20-0280494 | 6/2002 |
| NZ | 518317 | 1/2004 |
| RU | 220885 | 6/1968 |
| WO | WO 90/09611 | 8/1990 |
| WO | WO 99/15931 | 5/1999 |
| WO | WO 01/13163 A1 | 2/2001 |
| WO | WO 01/22153 A1 | 3/2001 |

\* cited by examiner

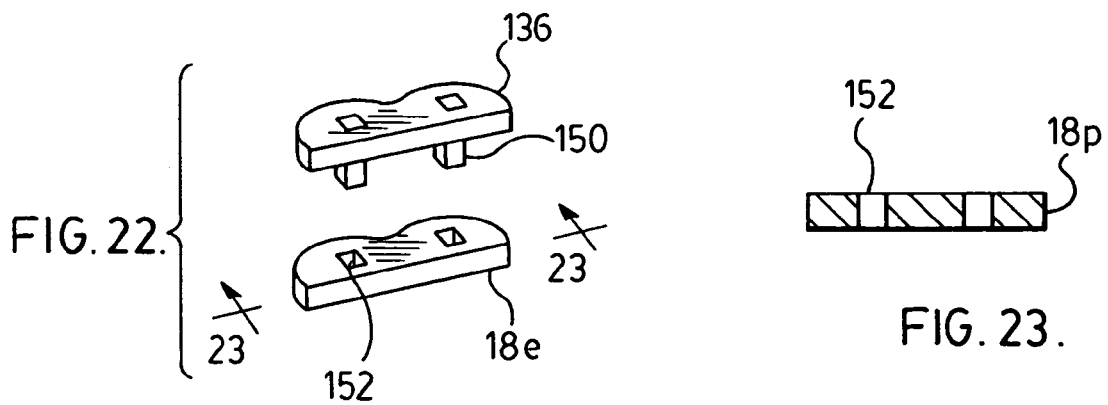
FIG. 22.
FIG. 23.
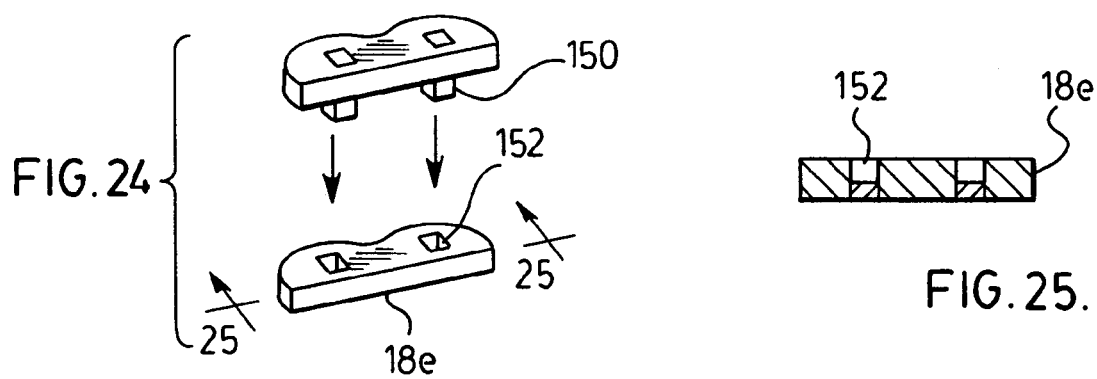
FIG. 24.
FIG. 25.
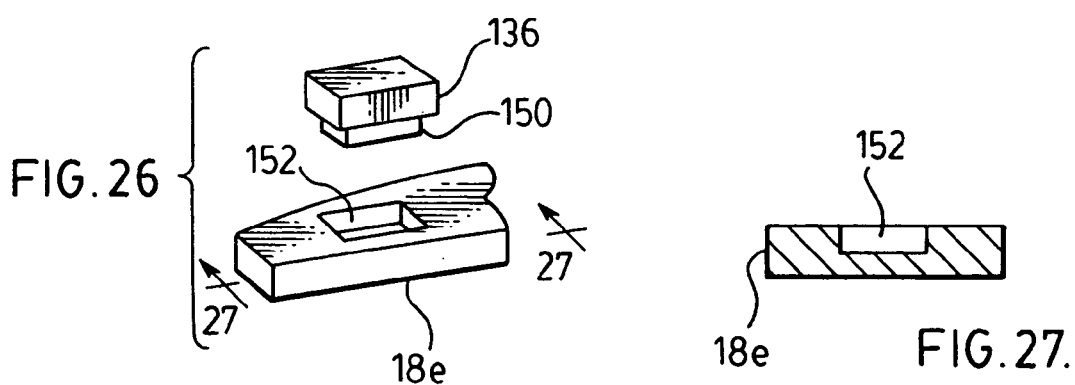
FIG. 26.
FIG. 27.

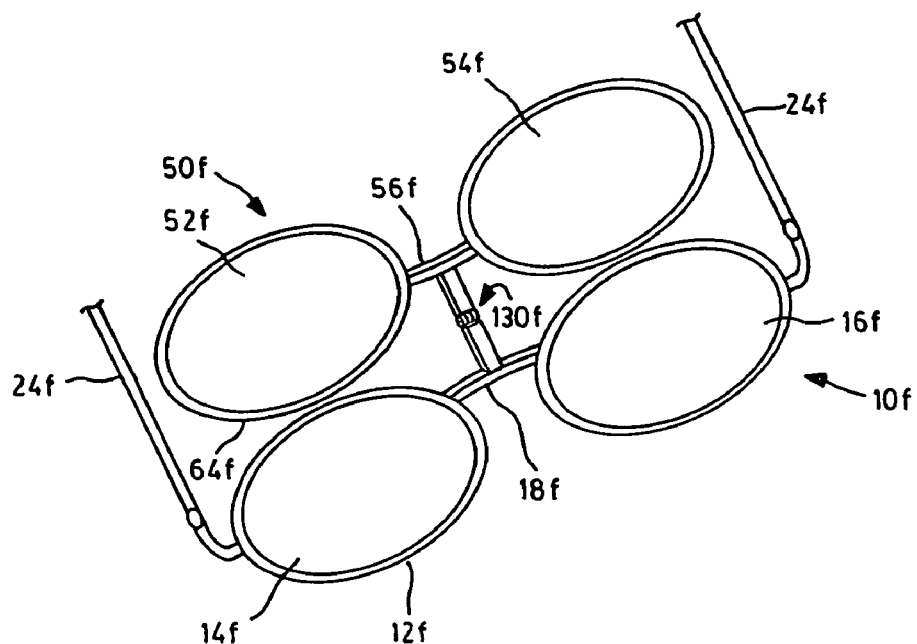
FIG. 28
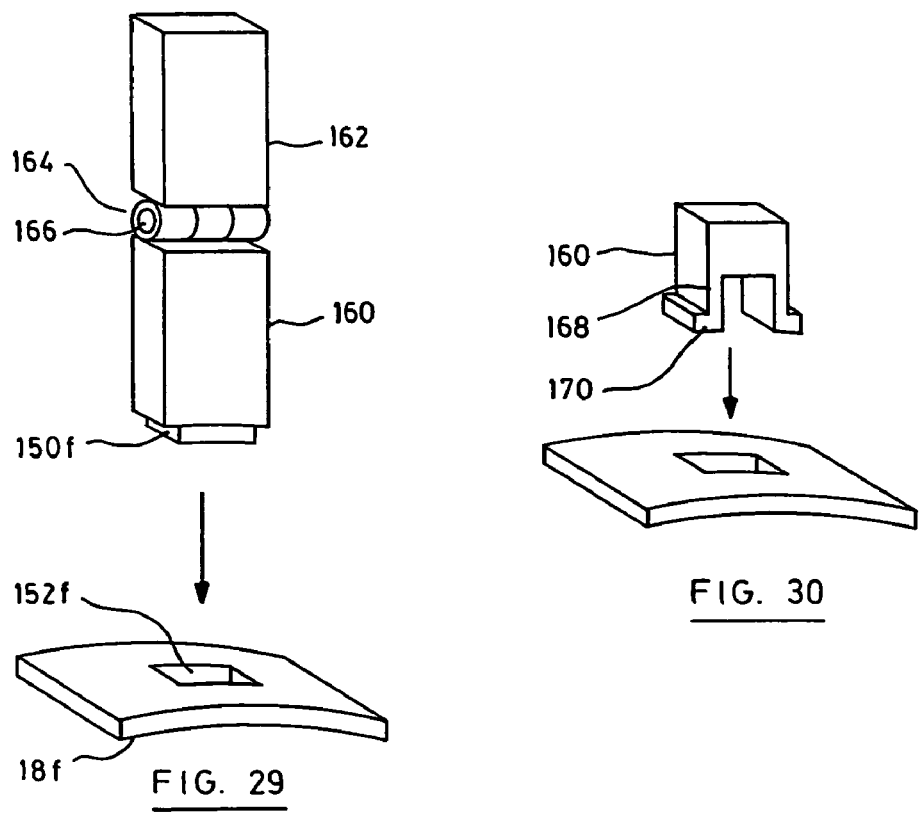
FIG. 29
FIG. 30

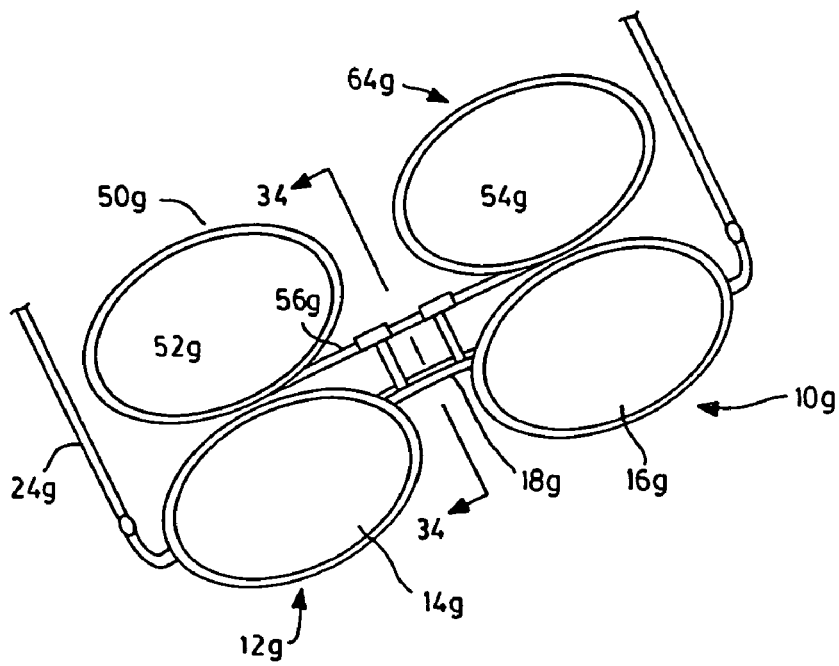
FIG. 31
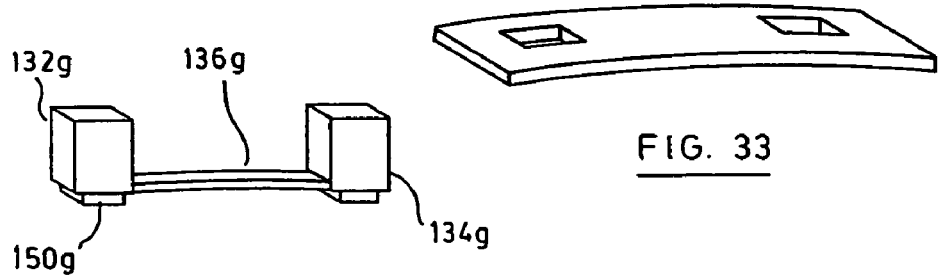
FIG. 32
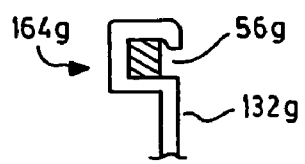
FIG. 34

EYEGLASS DEVICE

This application is a continuation in part of U.S. application Ser. No. 10/394,651 filed Mar. 24, 2003 now U.S. Pat. No. 6,820,976 which claims priority from U.S. Provisional Application No. 60/366,247 filed on Mar. 22, 2002.

FIELD OF THE INVENTION

The present invention relates to eyeglasses and to auxiliary lens assemblies for use with such eyeglasses.

The use of spectacles to correct deficiencies in vision is well known. Similarly, it is well known to use auxiliary lenses with spectacles to meet certain conditions, such as extreme brightness caused by the sun. Auxiliary lenses have traditionally been secured to the spectacles by mechanical clips that engage the frame of the spectacles. More recently, as shown in U.S. Pat. No. 5,568,207, magnets have been utilised to retain the auxiliary lens assembly on the spectacle frame. Such an arrangement has made the placement or removal of such lenses more convenient then with the mechanical clips.

In some situations, such as when driving through alternate bright and dark areas, it is not convenient to fit and remove the auxiliary lens assembly with each changing condition. One prior art solution is shown is U.S. Pat. No. 3,531,188 to Leblanc in which an auxiliary lens assembly is secured by clips to the spectacle with a hinge to permit the auxiliary lens assembly to be moved between a covered and uncovered position of the primary lens. In the Leblanc patent, the auxiliary lens assembly is secured by clips that not only are difficult to assemble but also suffer the risk of damaging the surface of the primary lens. Moreover, with the auxiliary lens assembly in a position to uncover the primary lens, the retaining clips are visible and therefore unattractive.

It is therefore an object to the present invention to provide an auxiliary lens assembly and eyeglasses incorporating such as assembly obviates or mitigates the above disadvantages.

In general terms, the present invention provides an auxiliary lens assembly for use with a pair of spectacles having a pair of primary lenses. The assembly has a pair of auxiliary lenses interconnected to one another by a bridge and a pair of arms, each associated with a respective arm of the lenses. Each of the arms is connected at one end to the auxiliary lens and has a magnetic member at an opposite end for connection to a magnetic member on the spectacle and thereby locate the assembly on the spectacles. Each of the arms includes a hinge to permit movement of the assembly between a first position in which the auxiliary lenses cover the primary lenses to a second position in which they do not cover the primary lenses.

In an alternative aspect, the present invention provides eyeglasses comprising a pair of spectacles having a pair of primary lenses interconnected by a bridge and a pair of temples pivotally connected to the primary lenses for retaining the spectacles on a user. A first magnetic member is located on the spectacles. An auxiliary lens assembly has a pair of auxiliary lenses interconnected to one another by a bridge. A second magnetic member is secured to the auxiliary lens assembly and positioned to co-operate with the first magnetic member to retain the auxiliary lens assembly on the spectacles. A hinge between the spectacles and the auxiliary lens assembly permits the auxiliary lens assembly to move whilst secured to the spectacles between a first position in which the primary lenses are covered by said auxiliary lenses and a second position in which said auxiliary lenses do not cover said primary lenses.

BRIEF DESCRIPTION OF THE DRAWINGS

Embodiments of the invention will now be described by way of example only with reference to the accompanying drawings in which:

FIG. 22 is a view similar to FIG. 20 on a yet further embodiment.
FIG. 23 is a view on the line 23—23 of FIG. 22.
FIG. 24 is a view similar to FIG. 22 of a further embodiment.
FIG. 25 is a view on the line 25—25 of FIG. 24.
FIG. 26 is a view similar to FIG. 24 of a further embodiment,
FIG. 27 is a view on the line 27—27.
FIG. 28 is a front perspective view of a further embodiment.
FIG. 29 is an enlarged view of a portion of the embodiment of FIG. 28, showing one form of connection.
FIG. 30 is a view similar to FIG. 29 showing an alternate form of connection.
FIG. 31 is a perspective view of a further embodiment of eyeglass.
FIG. 32 is an enlarged view of a portion of FIG. 31 showing one form of connection.
FIG. 33 is a view similar to FIG. 32 of an alternative form of connection.
FIG. 34 is a view on the line 34—34 of FIG. 31.

Figure 1:
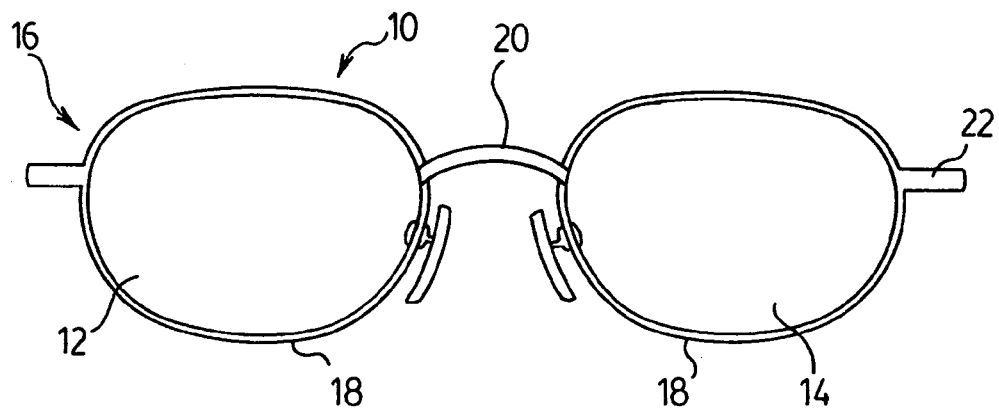
FIG. 1 is a front elevation of a pair of spectacles.
Figure 2:
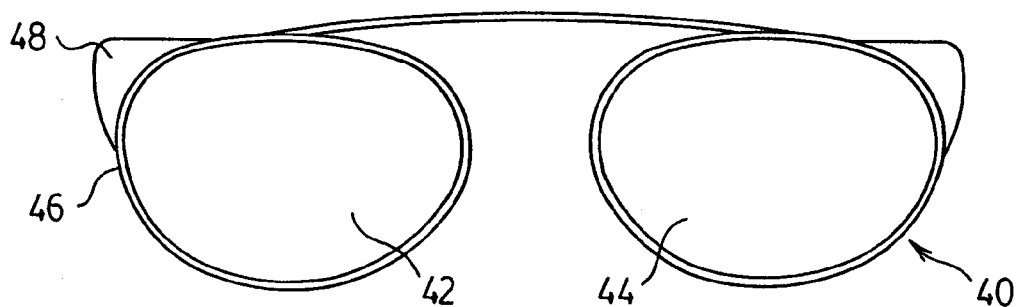
FIG. 2 is a front elevation of an auxiliary lens assembly.

Referring therefore to FIG. 1, a pair of spectacles 10 includes a pair of primary lenses located within a frame 16. The frame 16 includes a pair of lens rims 18 interconnected by a bridge 20. The frame 16 also includes hinge pedestals 22 that are connected to temples 24 by a hinge pin 26. The temples 24 extend rewardly along the sides of the users head and secure the spectacles in a well known manner.

Figure 3:
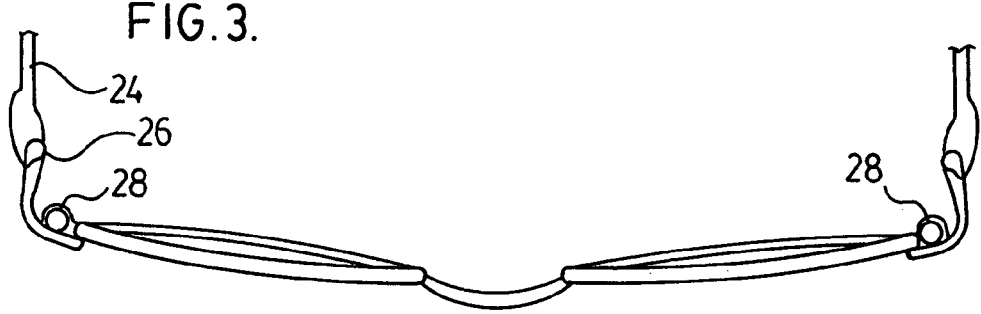
FIG. 3 is a plan view of the spectacle shown in FIG. 1.
Figure 4:
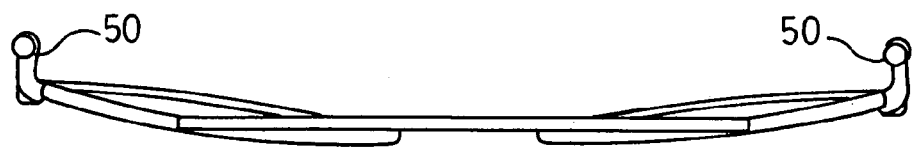
FIG. 4 is a plan view of the auxiliary lens assembly shown in FIG. 2.
Figure 5:
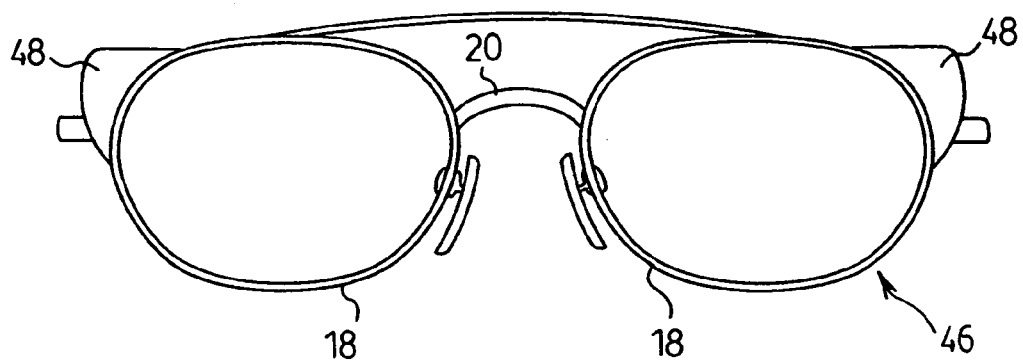
FIG. 5 is a front elevation of the eyeglasses formed from a combination of the spectacles of FIG. 1 and the auxiliary lens assembly of FIG. 2.
Figure 6:
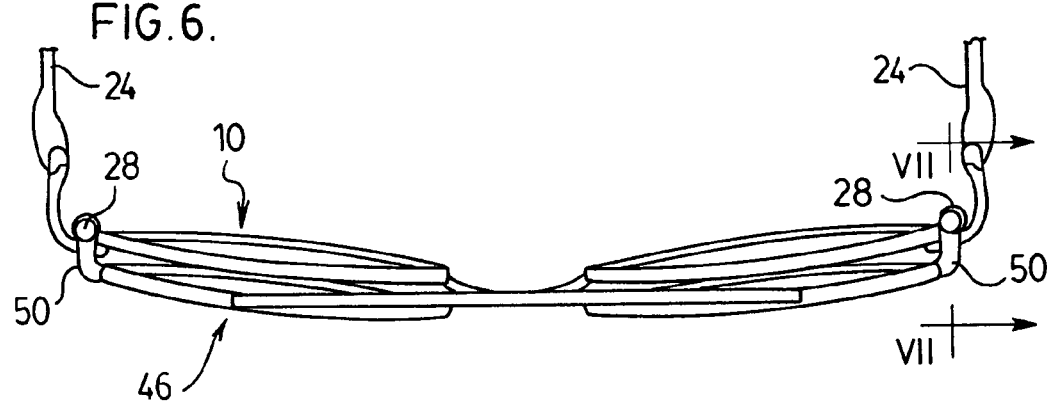
FIG. 6 is a plan view of FIG. 5.
Figure 7:
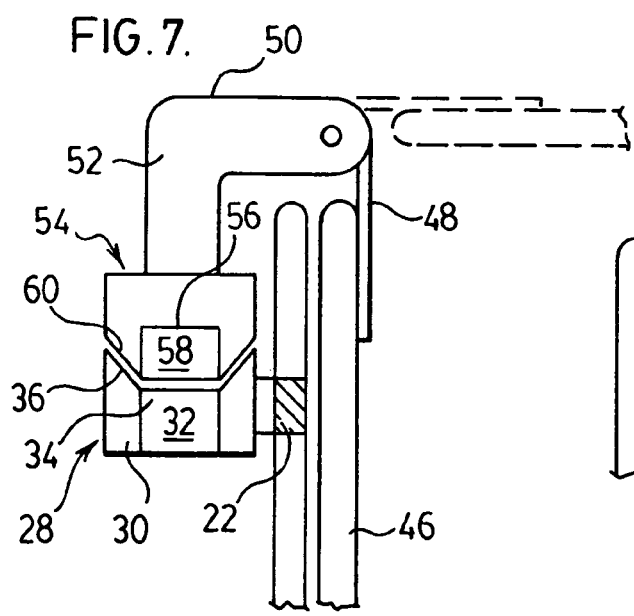
FIG. 7 is a view on the line 77 of Figure on a larger scale.

A pair of housings 28 are provided on the frame 16 adjacent to the temples 24. As shown in FIG. 3, the housings 28 are located behind the pedestals 22 so as not to be seen from the front. The housing 28 is shown in greater detail in FIG. 7 and includes an annular collar 30 that encompasses a magnet 32. The magnet 32 has one of its surfaces 34 exposed and a flange 36 on the collar 30 extends about the periphery of the magnet 32.

An auxiliary lens assembly 40 similarly comprises a pair of auxiliary lenses 42, 44 contained within a frame 46. The frame 46 includes a pair of wings 48 that project upwardly in the temple regions of the frames 46. A pair of arms 50 are secured to the wings 48 and extend rewardly from the frame 46. As again, can be best seen in FIG. 7, each of the arms 50 extends from the wing 48 to the housing 28 and has an elbow indicated at 52 intermediate its ends. The distal end of the arm 50 remote from the wing 48 has a housing 54 with a recess 56 to accommodate a second magnet 58. A lower face 60 of the housing 54 abuts the flange 36 when the magnets 58, 32 are in engagement.

Figure 8:
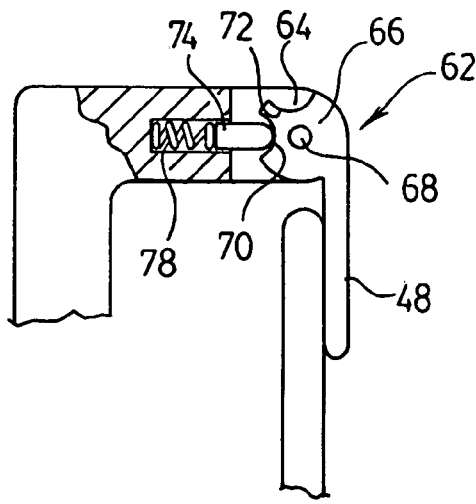
FIG. 8 is a view similar to FIG. 7 partly in section.

The arm 50 is secured to the wing 48 through a hinge 62 shown in FIG. 8. The hinge 62 includes a slot 64 formed at one end of the arm 50. A hinge body 66 formed at the end of the wing 48 is located in the slot 64 and secured for pivotal movement by a hinge pin 68. The hinge body 66 has a pair of recesses 70, 72 that is shaped to receive the curved end of a pin 74. The pin 74 is slidable in a bore 76 in the arm 50 and biased by a spring 78 into engagement with the hinge body 66. The pin 74 thus provides a detent by co-operation with the recesses 70, 72 that biases the hinge to one of two positions.

In use, the auxiliary lens assembly is attached to the spectacles 46 by aligning the magnets 58 and 32. The magnets provide a retaining force to hold the auxiliary lens assembly 46 on the spectacles 10. In the position shown in solid lines of FIG. 7, the auxiliary lenses 42, 44 are positioned to cover the primary lenses 12, 14 respectively and therefore provide additional protection to the user. When the protection is no longer needed, the auxiliary lens assembly 46 may be rotated relative to the arm 50 about the hinge 62.

As the auxiliary lens assembly 46 is rotated, the pin 74 is moved against the bias of the spring 78 and out of the recess 70. It then assists the continued rotation by entering into the recess 72 to hold the auxiliary lens assembly 46 in the position shown in chain dot lines in FIG. 7. During this rotation, a couple is applied to the arm 50 which is resisted by the retaining forces provided by the magnets 58, 32. The resistance to movement provided by the detent in the hinge 62 is less than the retaining force provided between the magnets 58, 32 so that the arm 50 remains in a stable position.

The stability of the arm is enhanced by the abutment between the flange 36 and the lower face of the housing 54. The radial extent of the flange and face increases the resistance to separation of the magnets 58, 32 as a couple is applied to the arm 50. The inclined flanks of the flange and face also provide radial location for the arm 50 relative to the housing 28 to resist shear forces between the magnet 58 and 32. Accordingly, a stable attachment between the auxiliary lens assembly 46 and the spectacles 10 is obtained. It will however be appreciated that where sufficient magnetic force is provided, the provision of a flange is not essential, and, where a flange is used is may be flush with the magnets rather than providing lateral location.

Figure 9:
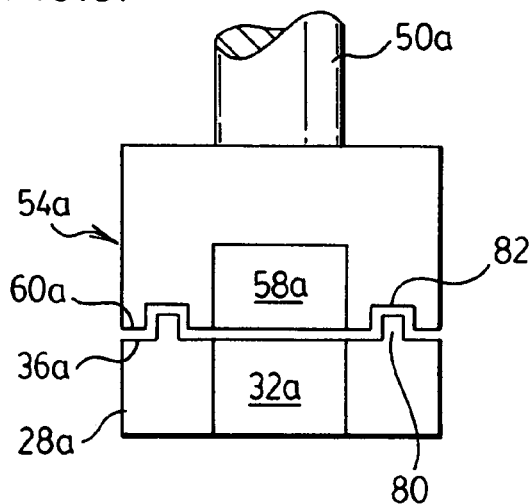
FIG. 9 is a detailed view of a first alternative embodiment to the arrangement shown in FIG. 7.

As shown in FIG. 9, in which like reference numerals will be used to denote like components with a suffix a added for clarity, an alternative configuration of housing 28a and housing 54a may be utilised. In the embodiments shown in FIG. 9, the magnet 32a, 58a are encompassed by the flange 36a and the face 60a respectively. The flange 36a and face 60a are planar with an annular upstanding ridge 80 provided on the flange 36a. A corresponding recess 82 is formed in the face 60a and the inter-engagement of the ridge 80 and recess 82 provides lateral location for the two housings but also provides a mechanical interference against tipping of the arm 50a during movement of the auxiliary lens assembly. This further enhances the stability of the connection.

Figure 10:
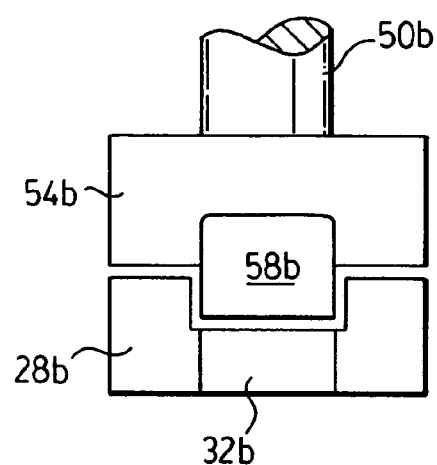
FIG. 10 is a view similar to FIG. 9 of a second alternative embodiment to that shown in FIG. 7.

A similar arrangement is shown in FIG. 10 in which like components will be identified by like reference numerals with a suffix b added for clarity. In the embodiment of FIG. 10, the magnet 58b projects from the end face of the housing 54b and the magnet 32b is recessed in the housing 28b. Accordingly, lateral displacement between the arm 50b and the housing 28b is inhibited and tipping of the arm 50b relative to the housing is also inhibited due to the mechanical interference between the inter-engagement of the magnet 58b and the walls of the housing 28b.

Figure 11:
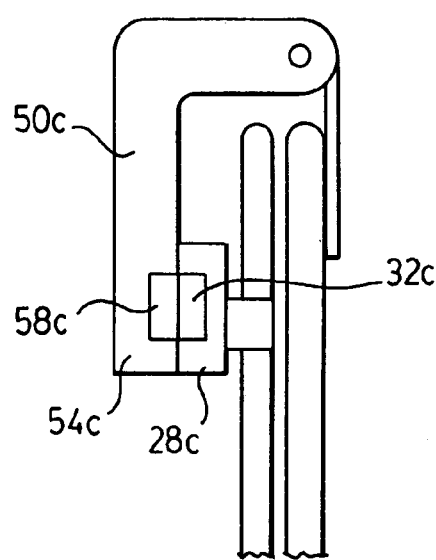
FIG. 11 is a side view similar to FIG. 7 of an alternative configuration.

In each of the above arrangements, the exposed faces of the magnets 32, 58 are disposed normal to the plane containing the primary lenses 12, 14, i.e. they are generally horizontal when worn. In the embodiments shown in FIG. 11, the housing 28c and 54c are disposed such as the exposed faces of the magnets 32c, 58c are parallel to the plane containing the primary lenses 12, 14. Thus the arm 50c depends downwardly behind the pedestal 22c with the magnet 58c facing forwardly to engage the rearwardly directed face of the magnet 32c. As will be appreciated, the flange provided in each housing enhances the stability and, the mechanical interconnection described above with respect to FIGS. 7, 9 and 10 may also be incorporated in this arrangement.

Figure 12:
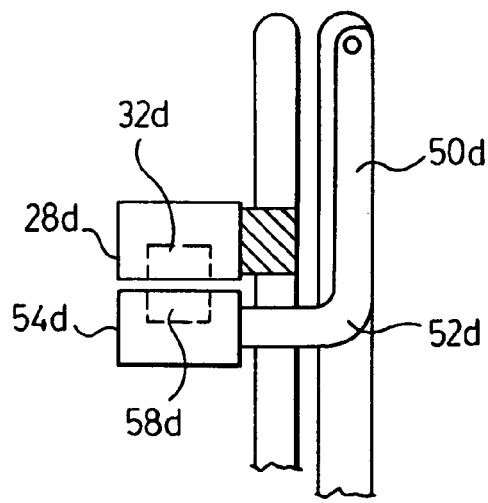
FIG. 12 is a view similar to FIG. 7 of a further alternative configuration.

The arm 50d may also be arranged as shown in FIG. 12 to present the housing 54d to the underside of the housing 28d rather than to the top of the housing as shown in the previous embodiments. In this case, the magnet 32d is disposed with its exposed face downwardly directed and the magnet 58d disposed with its exposed face upwardly directed. The arm 50d extends parallel to the frame of the auxiliary lens assembly 46 with the elbow 52d located beneath the pedestal 22d. Again, the magnets may be arranged to be flush with the surfaces of the housings 54d, 28d or may incorporate the mechanical interaction shown in FIGS. 7, 9 and 10 and described above.

In each of the above embodiments, the magnetic connection between the auxiliary frame 50 and the primary 12 is located at the temple region. In a further set of embodiments shown in FIGS. 13 through 27, an alternative arrangement is utilised in which the bridge is used to retain the auxiliary frame and accommodate the relative movement.

Figure 13:
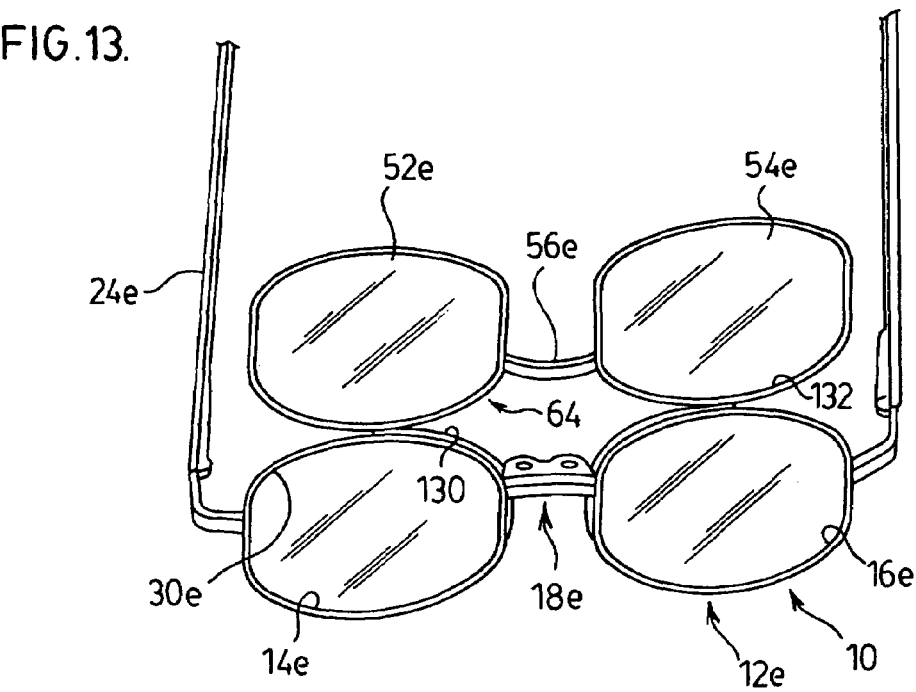
FIG. 13 is a perspective view of a further embodiment.

Referring therefore to FIG. 13, the eyeglasses 10e are provided with a main frame 12e with lens openings 14e and 16e respectively. A bridge 18e connects the frames defining the lens openings and side arms 24e extend rearwardly from the temple region of the primary frame 12e.

The auxiliary frame 50e similarly has a pair of lens opening 52e, 54e interconnected by a bridge 56e. The lens opening 52e, 54e are defined by the main frame member 64e.

Figure 14:
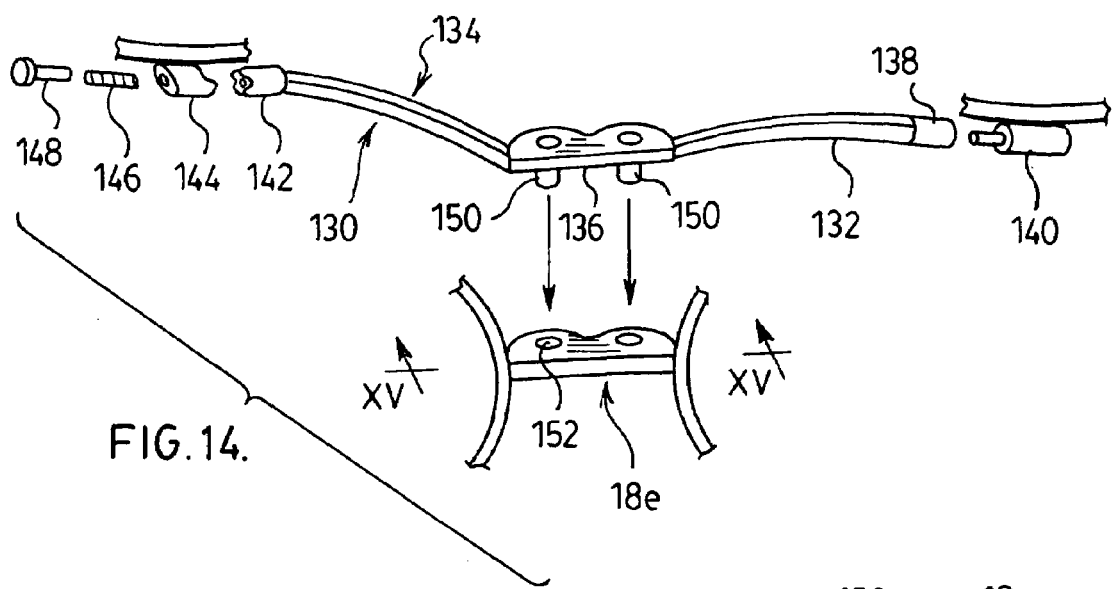
FIG. 14 is an enlarged view of a portion of the embodiment of FIG. 13.

In order to secure the auxiliary frame 50e to the main frame 12e, a sub frame 130 is utilised. The sub frame 130, which is best seen in FIG. 14, has a pair of arms 132, 134 projecting outwardly from a bridge member 136. The arms 132, 134 conform to the shape of an upper portion of the main frame 12e and each terminates in a hinge for connection to the auxiliary frame 50e.

The arm 132 terminates in a pin 138 that is received within a tubular sleeve 140 secured to the main frame 64e of the auxiliary lenses 50e. The arm 134 terminates in a threaded boss 142 that is aligned with a sleeve 144 secured to the main frame 64e. A bolt 148 passes through a spring 146 and the sleeve 144 and is retained in the bush 142. The end faces of the bush 144 and sleeve 142 are contoured to provide a pair of detents, each of which holds the frame 50e in a stable position. Thus, the auxiliary frame 50e may pivot relative to the sub frame 130 and be retained in one of a pair of stable positions.

Figure 15:
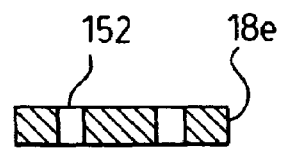
FIG. 15 is a view on the line XV—XV of FIG. 14.

The bridge member 136 has a pair of magnets 150 projecting downwardly below the bridge member 136. The magnets 150 are received in a pair of sockets 152 formed in the bridge 18e. The sockets 152 pass through the bridge member as can be seen in FIG. 15 and the bridge member 18e is made from a magnetic material. The magnets 150 thus retain the bridge member 136 on the bridge 18e to secure the sub frame 130 on the main frame 10e.

In operation therefore, the sub frame 130 may be secured to the bridge 18e with the auxiliary frame 50e projecting upwardly as shown in FIG. 33. In this position, the auxiliary lenses 52e, 54e are out of the line of vision of the user and are held in a stable position. When the shade provided by the auxiliary lens is required, the auxiliary frame 50e is rotated relative to the sub frame 130 to cause the lenses 52e, 54e to overlie the main lenses 14e, 16e. The auxiliary frame 50e is maintained in a stable position relative to the main frame to provide the shade.

Figure 16:
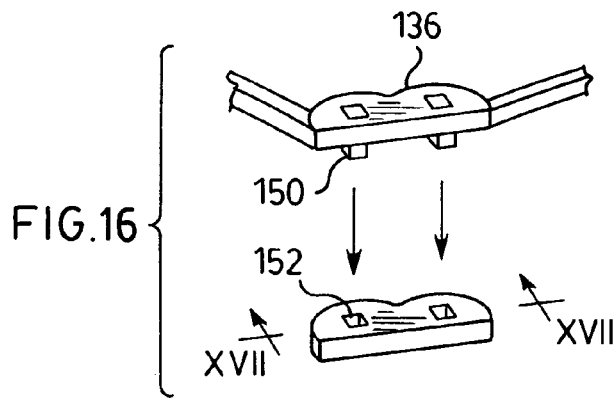
FIG. 16 is a view similar to FIG. 14 of an alternative embodiment.
Figure 17:
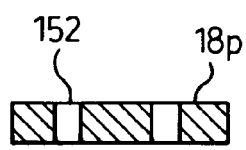
FIG. 17 is a view on the line XVII—XVII of FIG. 16.
Figure 18:
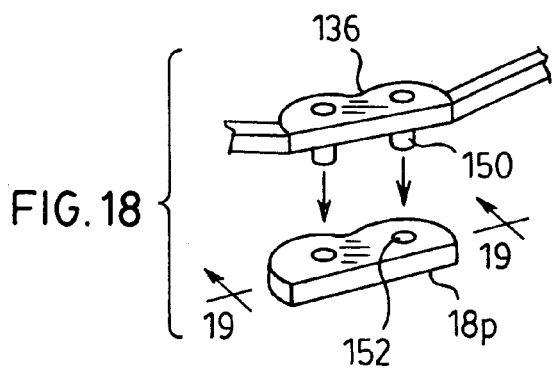
FIG. 18 is a view similar to FIG. 16 of a still further embodiment.
Figure 19:
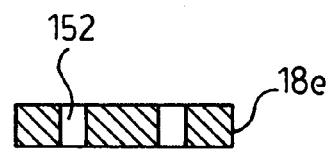
FIG. 19 is a view on the line 19—19 of FIG. 18.
Figure 20:
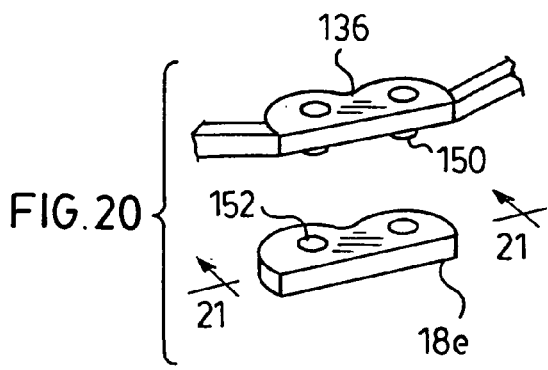
FIG. 20 is a view similar to FIG. 18 of a still further embodiment.
Figure 21:
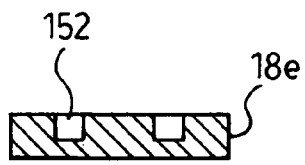
FIG. 21 is a view on the line 21—21 of FIG. 20.

In the embodiments shown in FIGS. 14 and 15, the sockets 152 pass through the bridge 18e. Alternatively, as shown in FIGS. 16 and 17, the sockets 152 do not pass through the bridge 18e to provide a solid base to retain the magnet. The magnets 150 are received in the sockets 152.

In the embodiment of FIG. 16, the magnets are a square cross section but as shown in FIGS. 18 and 19 and FIGS. 20, and 21 the magnets may be an alternate cross section such as circular, as shown in those Figures.

Where the material of the bridge 18e is not magnetic, attraction between the sub frame 130 and the bridge 18e may be obtained by the insertion of magnets 154 at the lower end of the sockets 152. The magnets 150 thus engage the magnets 154 to retain the sub frame on the bridge. In the arrangement shown in FIGS. 22 and 23, the magnets 150 and sockets 152 are square in cross section whereas as shown in FIGS. 24 and 25, the magnets are circular in cross section.

In the above embodiments, a pair of magnets 152 have been utilised but as shown in FIGS. 26 and 27 a single magnet may be utilised. In this case, the bridge 18e is formed from magnetic material and has a socket 152 formed centrally in the upper surface. A square section magnet 150 depends from the bridge member 136 to secure the auxiliary frame 50e to the main frame.

In each of the above embodiments the sub frame 130 permits the pivotal movement of the auxiliary frame between the first position in which the lenses are shaded and a second position in which the auxiliary lenses are maintained out of the line of vision.

A further arrangement of hinge connection is shown in FIGS. 28 through 30. Like reference numerals will be used to denote like components with a suffix "f" added for clarity. The eyeglasses 10f are provided with a main frame 12f with lens openings 14f and 16f respectively. A bridge 18f connects the frames defining the lens opening and side arms 24f extend rearwardly from the temple region of the primary frame 12f.

The auxiliary frame 50f similarly has a pair of lens openings 52f, 54f interconnected by a bridge 56f. The lens openings 52f, 54f are defined by the main frame member 64f.

In order to secure the auxiliary frame 50f to the main frame 12f, a subframe 130f is utilized. The subframe 130f includes a pair of arms 160, 162 that are pivotally connected by a hinge 164. The arm 160 has a magnet 150f projecting from the end opposite to the hinge 164 that is complimentary in shape to a socket 152f formed in the bridge 18f. The arm 162 is connected at its distal end to the bridge 56f of auxiliary frame 50f. The hinge 164 includes a pivot pin 166 that provides a frictional resistance to movement between the arms 160 and 162.

The bridge 18f is formed from magnetic material or has a magnetic material inserted in the socket 152f. To secure the auxiliary frame 50f to the main frame 12f, the arm 160 is aligned with the socket 152f and the magnet 150f inserted into the socket. The arm 160 is secured generally perpendicular to the bridge 18f to support the auxiliary frame. The hinge 164 permits the auxiliary frame 50f to be pivoted from a position in which the auxiliary lenses 52f, 54f overlie the primary lenses 14f, 16f to a position in which they are out of the field of vision. The frictional resistance provided by the hinge 164 enables the lenses to be maintained in a stable position in either configuration.

To provide an additional security for the subframe 130f, a mechanical connection may be utilized as shown in FIG. 30. In the embodiment of FIG. 30, the lower end of the arm 160 is formed with a pair of flexible tangs 168 with outwardly directed feet 170. The feet 170 are a snug fit within the socket 152f and thereby allow the arm 160 to be inserted into the socket 152f and retain the arm 160 in position. Thus in the embodiment of FIGS. 28 through 30, the hinge 164 is incorporated into the subframe 130f.

A further embodiment in which the hinge is provided between the subframe and auxiliary frame is shown in FIGS. 31 through 34. Like reference numerals will denote like components with a suffix "g" added for clarity. Eyeglasses 10g include a main frame 12g with lens openings 14g, 16g respectively. A bridge 18g connects the frame defining the lens openings and side arms 24g extend rearwardly from the temple region of the primary frame 12g.

The auxiliary frame 50g similarly has a pair of lens openings 52g, 54g defined by a main frame member 64g and interconnected by a bridge wire 56g.

In order to secure the auxiliary frame 50g to the main frame 12g, a subframe 130g is utilized. The subframe 130g has a pair of arms 132g, 134g interconnected by a bridge 136g. The arms 132g, 134g extend parallel to one another toward the bridge 56g on the auxiliary frame 50g. Magnets 150g protrude from the lower end of the arms 132g, 134g and are received in respective sockets 152g formed in the bridge piece 18g.

The opposite end of arms 132g, 134g terminate in a hinge arrangement 164g best shown in FIG. 34. The distal end of the arm 132g is formed to encompass the bridge 56g. As can be seen from FIG. 34, the bridge wire 56g has a square cross-section and the terminal portion of the arm 132g is bent around the bridge wire 56g in a complimentary shape. The arm 134g is similarly formed about the bridge wire 56g.

In operation, the magnets 150g secure the subframe 130g to the bridge 18g. The hinge 164g permits rotation of the auxiliary frame 50g between a position in which the lenses 52g, 54g overlay the lenses 14g, 16g and a position in which they are out of the line of vision. The rotation is accommodated by the hinge arrangement shown in FIG. 34 with the square section of the bridge wire 56g providing stable positions for the auxiliary frame. The forming of the leg 132g about the bridge 56g provides a certain degree of flexure in the hinge to accommodate the rotation of the bridge 56g relative to the legs 132g, 134g.

Further retention of the legs 132g, 134g may also be obtained using a mechanical connection as shown in FIG. 33 similar to that shown in FIG. 30.

The embodiments of the invention in which an exclusive property or privilege is claimed are defined as follows:

1. An auxiliary lens assembly for use with a pair of spectacles having a pair of primary lenses interconnected by a first bridge, said assembly comprising an auxiliary frame having a pair of auxiliary lenses interconnected to one another by a second bridge; and a subframe for detachably interconnecting said first bridge to said second bridge, said subframe connected to said second bridge at one end and adapted for releasable connection to said first bridge at an other end, said subframe adapted to permit movement of said assembly between a first position in which said auxiliary lenses cover said primary lenses to a second position in which they do not cover said primary lenses and to retain said assembly in either of said positions.

2. The assembly of claim 1 wherein said releasable connection to said first bridge is provided by a magnetic connection thereto.

3. The assembly of claim 2 wherein said magnetic connection comprises a magnetic member of said other end interacting with a magnetically attractive socket on said first bridge.

4. The assembly of claim 3 wherein said socket comprises a magnetic member inserted therein.

5. The assembly of claim 2 wherein said magnetic connection is provided by a magnetic member of said other end engaging said first bridge, said first bridge being made of a magnetic material.

6. The assembly of claim 1 wherein said releasable connection to said first bridge is provided by a mechanical connection thereto.

7. The assembly of claim 6 wherein said mechanical connection is provided by said other end interacting with a socket on said spectacles.

8. The assembly of claim 7 wherein said other end comprises a pair of tangs with outwardly directed feet, said feet operable to detachably fit said tangs in said socket to provide said mechanical connection.

9. The assembly of claim 1 wherein said subframe comprises a first leg and a second leg interconnected by a hinge intermediate said one end and said other end, said hinge adapted to permit said movement of said assembly between said first and second positions and retain said assembly in either of said positions.

10. The assembly of claim 9 wherein said hinge comprises a friction pin to provide frictional resistance that enables said hinge to retain said assembly in said positions.

11. The assembly of claim 1 wherein said subframe comprises a first arm having a first rotatable connection to said second bridge at said one end, said first rotatable connection being operable to permit said movement of said assembly between said first and second positions and to retain said assembly in either of said positions.

12. The assembly of claim 11 wherein said first rotatable connection interacts with the cross-sectional shape of said bridge to retain said assembly in said positions.

13. The assembly of claim 11 wherein said subframe further comprises a second arm being parallel with said first arm, said second arm having a second rotatable connection to said bridge at one end thereof, and adapted for releasable connection to said spectacles at another end thereof.

14. The assembly of claim 13 wherein said first and second arms are interconnected by a third bridge to provide further stability to said subframe.

\* \* \* \* \*